United States Patent [19]

Ni et al.

[11] Patent Number: 5,720,092
[45] Date of Patent: Feb. 24, 1998

[54] METHOD FOR HYDROFORMING A VEHICLE SPACE FRAME

[75] Inventors: Chi-Mou Ni, Troy; Charles J. Bruggemann, Rochester Hills, both of Mich.

[73] Assignee: General Motors Corporation, Detroit, Mich.

[21] Appl. No.: 709,396

[22] Filed: Aug. 21, 1996

[51] Int. Cl.⁶ .................................................. B23P 17/00
[52] U.S. Cl. ............................ 29/421.1; 29/523; 228/155
[58] Field of Search ............................... 29/421.1, 523; 228/155, 173.4; 72/61

[56] References Cited

U.S. PATENT DOCUMENTS

| 609,734 | 8/1898 | Crowden | 72/61 |
|---|---|---|---|
| 2,091,982 | 9/1937 | Hart | 228/173.4 |
| 3,002,269 | 10/1961 | Hopkins | 29/421.1 |
| 3,841,547 | 10/1974 | Bartley | 228/29 |
| 4,759,111 | 7/1988 | Cudini | 29/523 |
| 5,233,856 | 8/1993 | Shimanovski et al. | 72/62 |
| 5,269,585 | 12/1993 | Klages et al. | 296/205 |
| 5,333,775 | 8/1994 | Bruggemann et al. | 228/157 |
| 5,491,883 | 2/1996 | Marlinga | 29/421.1 |

FOREIGN PATENT DOCUMENTS

| 3008840 A1 | 12/1980 | Germany . | |
|---|---|---|---|
| 4234463 A1 | 4/1994 | Germany . | |
| 670957 | 4/1952 | United Kingdom | 29/421.1 |
| WO 90/10797 | 9/1990 | WIPO . | |

OTHER PUBLICATIONS

American Machinist Special Report No. 618, Aug. 26, 1968 "Liquid bulge forming" pp. 73–81.

*Primary Examiner*—David P. Bryant
*Attorney, Agent, or Firm*—Patrick M. Griffin

[57] ABSTRACT

A vehicle space frame is built up piece by piece into an initial or rough frame, consisting of standard, cylindrical metal tubes welded to matching cylindrical plugs of hollow, nodal joints. All weld seams are circular and, therefore, easily and quickly formed, and the initial frame need be formed only with the accuracy that plugging the ends of the tubes into the joints will achieve. The entire interior of the initial frame is then clamped between a large pair of dies with mating cavities, and hydroformed to provide a final frame with the desired non cylindrical cross section and accurate, final shape and form.

3 Claims, 2 Drawing Sheets

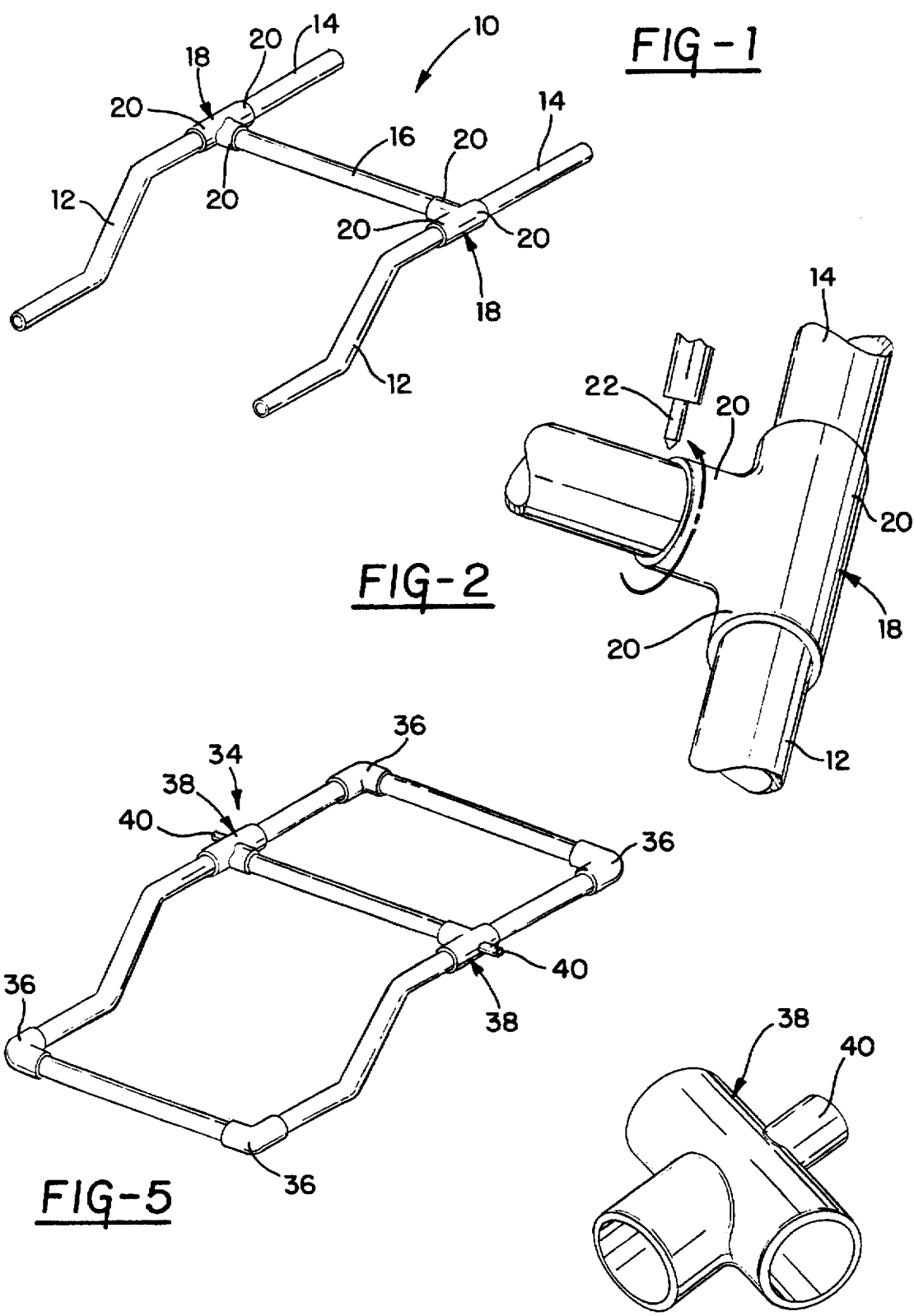

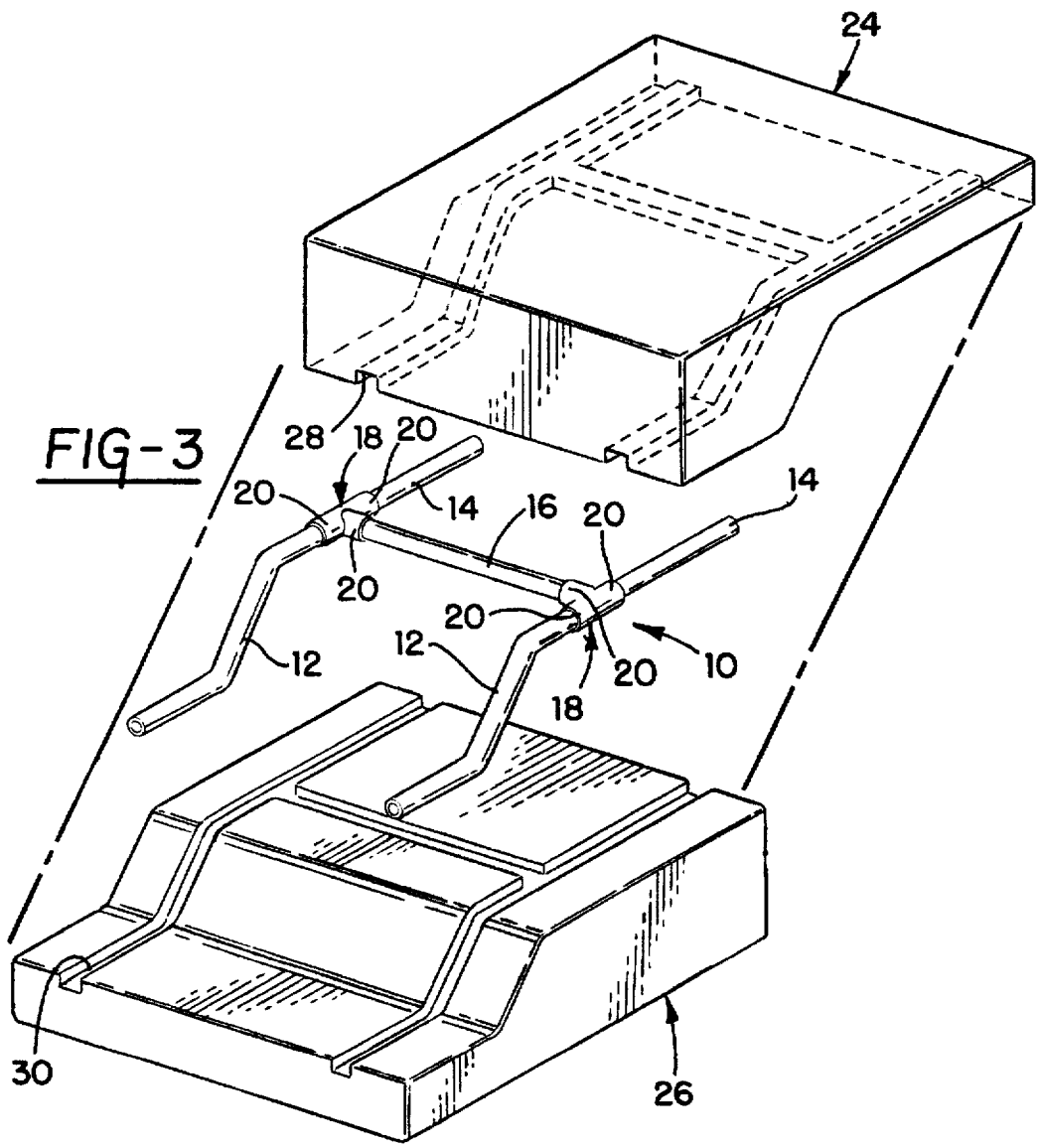
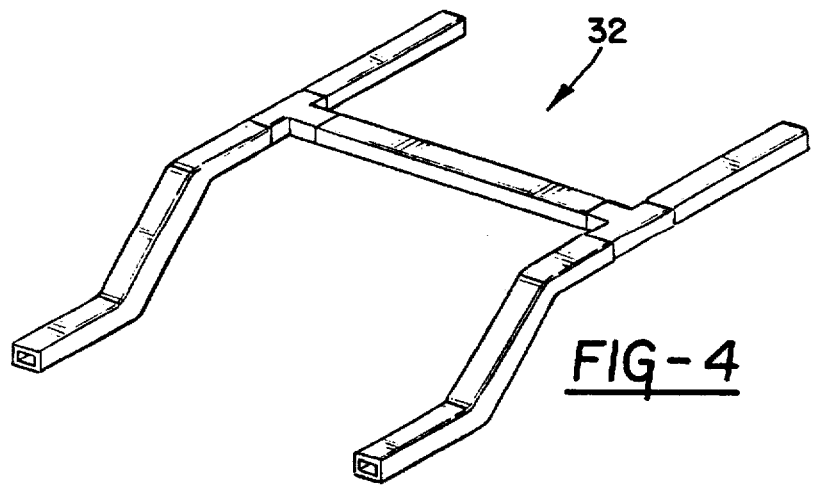

METHOD FOR HYDROFORMING A VEHICLE SPACE FRAME

This invention relates to methods of manufacturing vehicle space frames in general, and specifically to a method for manufacturing such a space frame by hydroforming all or most of it in one step.

BACKGROUND OF THE INVENTION

As part of a continuing effort to improve vehicle weight, performance and cost, the concept of a so called space frame has garnered increasing attention, especially as reflected in patents world wide, and to a lesser extent in actual production. In general, a space frame is a frame structure for a vehicle that consists of a cage like collection of separate, shorter beams fastened together at their ends into a complete structure, somewhat analogous to a house flame. This, as contrasted to the more common "uni body" vehicle construction in which the entire vehicle body, both the load bearing and weather exclusion portions thereof, are both formed of the same type of stamped sheet steel. The general theory of space frame construction is that the weather exclusion and appearance parts of the body, the so called "skin" of the vehicle, may be simply hung over the frame, and be of a lighter material, thereby potentially saving weight over all.

The promise has been greater than the practice for space frame vehicle construction, mainly due to problems of real world manufacture. The ideal space frame, in terms of ease of construction, would be highly uniform, with constituent members that were uniform in cross section and shape, and which were cut from standard available stock. However, some portions of the load bearing frame will inevitably need to be heavier that others, and making all the frame members of uniform cross section would require making them all as large, in cross section, as the necessarily strongest members, with a real weight penalty. Likewise, cutting all the members form uniform stock would be impractical. The most widely available and inexpensive uniform stock is cylindrical tubing, which is unattractive for a vehicle frame for the same reason that round, untrimmed logs are seldom suitable for house framing. That is, there are no flush surfaces to which to attach other parts. In addition, the frame itself, as a final product, will, of necessity, have many non uniform curved and bent members, in order to match the desired contours of today's increasingly streamlined vehicles.

To produce the separate constituent beam members with the desired variant cross sectional shapes, contours, and wall thickness, many methods may be used. They may be extruded, fabricated from separate pieces like box beams, or even hydroformed, although extrusion appears to be the most common method. However the separate constituent parts are produced, known space frames are invariably assembled in a piece meal or "tinker toy" fashion, with the beam ends plugged onto or into separate joint members or "nodes." Much attention has been given in the published patents to the production of the nodes themselves, which may be slabbed off of a long, standard extrusion or separately hydroformed. They may even consist of split sleeves that are clinched over the ends of the separate beams or tubes, rather than single pieces. The ends of the constituent beams or tubes may be fixed to the nodes by welding, riveting, gluing, or any method, although welding is the most common and generally most desirable process. A real problem here is that, given the non uniform and usually non cylindrical nature of the seams between the tube ends and the nodes to which they are to be welded, getting a welding tool or tip to successfully track and follow the seam is difficult and time consuming. In any case, with a piece by piece construction of the space frame, as with a house frame, it is inevitably difficult to hold tolerances. The location of the last attached tubes can wander far from "print", especially with large and long flames, and may require very careful fixturing and monitoring all along the way. This clearly adds to time and cost in manufacture.

SUMMARY OF THE INVENTION

The invention provides a space frame construction and assembly method that speaks to many of the practical problems noted above, providing a high degree of uniformity in the constituent tubes, improved welding of the tubes to the nodes, and, most important, a real departure from the standard, piece by piece assembly.

In the preferred embodiment of the method disclosed, rather than building up the final frame structure one piece at a time out of constituent beams that each have their final cross sectional shape from the start, an initial or "rough" frame is pre assembled, which is later sized and finished to "print" in one step by hydroforming. The constituent tubes of the initial frame are highly uniform, at least as to cross sectional shape, being all cylindrical, and so are easily cut from standard cylindrical tube stock. Only some rough bending of the tubes is initially needed. The ends of the cylindrical tubes are inserted into pre formed, hollow metal nodal joints, which have matching cylindrical plugs to receive the ends of the tubes. The nodal joints may be Y shaped, cross shaped, or whatever shape necessary to create the particular frame desired. As disclosed, the nodal joints are also hydroformed, but they, too, need not carry their final cross sectional shape from the start, and so may be simply cut from standard tube stock. While the initial or "rough" frame is built up piece by piece, the process is far simpler, since the uniform circular interfaces between the cylindrical tube ends and the plugs of the nodal joint plugs may be quickly and easily welded by the kind of automatic welders currently used for pipe lines and the like. The tolerances in the initial frame are not as critical as in typical space frame construction.

The pre assembled "rough" frame is then placed between large and massive hydroforming dies, which close around it, aligning it with a solid, accurately shaped forming cavity that matches the final shape desired for the finished space frame. The pre assembled frame blank is then pressurized initially by pumping a suitable fluid into it, either through available open tube ends, or, in the case of a closed frame, into injection points that are deliberately formed into some of the nodal joints. The dies are then closed over the pre pressurized rough frame, and the tubes and joints are all further internally pressurized together. This simultaneously forces all of the initially cylindrical tubes and joints out into the solid cavity, forcing them to take on their final cross sectional shape, be it square, rectangular, or whatever shape is needed at any point in the frame. The solid cavity also forces the frame into an accurate overall final shape, all at once, without the need for the continual measuring and monitoring typical of conventional piece by piece frame construction.

DESCRIPTION OF THE PREFERRED EMBODIMENT

These and other features of the invention will appear from the following written description, and from the drawings, in which:

FIG. 1 is a perspective view of one embodiment of a pre assembled initial frame, prior to final forming and sizing;

FIG. 2 is an enlarged view of a single nodal joint in the initial frame, illustrating the circular seam welding process;

FIG. 3 is a perspective view of the initial frame of FIG. 1 placed between a pair of dies;

FIG. 4 is a perspective view of the initial frame of FIG. 3 after final forming and sizing between the dies;

FIG. 5 is a perspective view of an alternative embodiment of an initial frame;

FIG. 6 is a perspective view of an embodiment of a special nodal joint used with the time of FIG. 5.

Referring first to FIG. 1, one embodiment of an initial or "rough" frame made according to the method of the invention is indicated generally at 10. Initial frame 10 is pre assembled from a number of standard cylindrical metal tubes, indicated at 12, 14 and 16. As disclosed, initial frame 10 is generally H shaped, with a single straight tube 16 forming a cross bar, two identical straight tubes 14 forming two legs of the H, and two longer, bent tubes 12 forming the other two legs of the H. This pattern is illustrative only, and could consist of larger and more complex shapes, if desired. While the tubes 12-16 differ from one another in length and linear shape, they are standardized in the sense that each is cylindrical, and each is cut from uniform metal tubular stock, typically steel or aluminum tubing. The ends of the three different tubes 12-16 are joined together at a pair of nodal joints of like metal, one of which is indicated generally at 18. Each nodal joint 18 is generally T shaped, with the three ends of the T comprising cylindrical sleeves or plugs 20, into which the ends of any of the tubes 12-16 makes a close slip fit. The nodal joints 18 are formed by the well known process of bulge forming which is similar to hydroforming. In bulge forming, a T, Y or even cross shaped piece is formed from a straight cylindrical blank by a combination of pressurizing the blank internally and pushing its ends axially into a die cavity. The internal pressure pushes or "bulges" part of the tube blank out into a side cavity or cavities that branch off within the die, forming the leg of a T or Y, or two legs of a cross, in whatever pattern, angle, and cross sectional shape is desired. Then, the closed ends of the bulges are pierced to complete the joint. Plumbing pipe fixtures are currently produced by the same method. Here, the plugs 20 are female sleeves, intended to receive the ends of the tubes 12-16 internally. They could, instead, be male, designed to plug into the ends of the tubes 12-16. Either way, the nodal joint 18 is hollow and the plugs 20 are cylindrical, which is more important to the method of the invention than the male or female configuration of the plugs 20. The female, sleeve type configuration is preferred, however, for reasons described below.

Referring next to FIG. 2, the importance of the cylindrical shape of both the tubes 12-16 and of the nodal joint plugs 20 resides not only in the standardized way in which they can be fitted together, but also in the ease with which the two can be welded together to complete the initial, rough frame 10. Since both are cylindrical, the seams between them are simple circles. And, since the plug 20 is a sleeve that fits over the ends of the tubes 12-16, those circular seams are farther from one another, and farther from the center of the joint 18, than they otherwise would be. As a consequence, the circular seams can be easily accessed and welded by a suitable tool or welding tip 22 that simply spins around in a circle, tracking the raised edge of the seam, as shown by the arrow. A circle is a far easier and quicker welding path to track or create than any polygonal shape made up of straight, intersecting lines, as is typically found with known space frame weld seams. Many automatic welders exist for tracking and creating circular weld seams already. An example may be seen in U. S. Pat. No. 3,841,547 issued Oct. 15, 1974 to Bartley. Even if standard welding robots are used, it is far easier to swing the welding tools around in a circle than to track an irregular, polygonal seam. Furthermore, if the cylindrical sleeve plugs 20 and ends of the tubes 12-16 are all the same diameter, then the seams are all the same diameter, which makes the welding process even simpler. However, even if the seam diameters vary, the fact that they are all circular still makes the welding process far simpler and quicker than for a standard space frame. Once all the seams are welded completely around 360 degrees, then the interiors of all the tubes 12-16 are interconnected into one continuous, leak free volume, since the nodal joints 18 are hollow. This fact is important to the next step in the process. It should be kept in mind that not only are the cross sectional shapes of the constituent members of initial frame 10 not final at this point in the process, the locations in space of various points on the frame is also not final or "print." Nor need they be. The rough frame 10 generally need only be built up with as much accuracy as the mere plugging of the constituent parts together will achieve. For larger frames, some simple fixturing might be needed for support. No continual monitoring of spatial accuracy is necessary, as with standard space flame construction.

Referring next to FIG. 3, once initial frame 10 has been completed, it is final formed between a pair of large hydroforming dies indicated generally at 24 and 26. The dies 24 and 26 are similar to standard hydroforming dies, in terms of shape, material of construction, and operation, but would clearly be significantly larger, since standard dies form only a single tube. Each die 24 and 26 has a matching cavity 28 and 30 respectively, which mate when the dies 24 and 26 close to form a single cavity matching, in shape and size, the outer contour desired for the entire frame structure in final form. With the H shaped initial frame 10 shown, which would be used for a floor, engine cradle, or the like, it is feasible for a single pair of large dies 24 and 26 to be used. In the case of a complete body supporting frame structure, the frame would likely need to be broken up into two or more separate sub frames, but each such sub flame would be formed in the same basic fashion. The initial frame 10 is simply placed between the dies 24 and 26, aligned with the cavities 26 and 28, as a typical, single tube would be. The accuracy with which the various tubes 12-16 are joined together, at this point, need only be sufficient to so locate the initial frame 10. Then, the open tube ends of the initial frame 10 are plugged and sealed, it is pre pressurized, and the dies 24 and 26 are closed, capturing it in and between the mating cavities 28 and 30. The apparatus used to plug, pre pressurize, and ultimately form the final frame would be essentially identical to that disclosed in coassigned U.S. Pat. No. 5,233,856 issued Aug. 10, 1993 to Shimanovski et al. The only significant difference, apart from the sheer size of the dies 24 and 26, is that more than two plugs and seals would be needed, four here, or as many as there were open tube ends. The basic hydroforming process can be the same, because of the fact that the open and hollow nodal joints 18 interconnect all of the interior of all parts of the initial frame 10, allowing it to be internally pressurized as effectively as a single tube would be.

Referring next to FIG. 4, the final result of internally pressurizing initial frame 10 between the dies 24 and 26 is a final frame 32 in which all tubes 12-16, including the nodal joints 18, have been pushed out and expanded concurrently, creating a final cross sectional shape matching that of the surface of the mating die cavities 28 and 30. In the embodiment shown, that cross sectional shape is basically rectangular, though it could be any shaped desire. Now, the final frame 32 has all the flat and flush surfaces necessary in a space frame for the attachment of body panels or the like. In addition, the location in space of all points on the surface of the final frame 32 will have been determined by the shape of the heavy, accurately formed dies 24 and 26, with no need for fixturing or measuring. The effort put once into the machining of the heavy dies 24 and 26 is reflected repeatedly in each frame 32, simply from carrying out the basic hydroforming expansion process. The final frame 32 can be formed as quickly, accurately and repeatably as any single tube could be hydroformed. The degree of stretch and deformation of the surfaces of the constituent tubes 12–16, as well as the welded seams, is well within the allowable percentage limits feasible for single tubes.

Referring next to FIGS. 5 and 6, an alternate frame structure, shown just in its initial form generally at 34, is disclosed. Initial frame 34 has a similar shape to 10, but is formed as a closed, figure eight shape, with no open ends. As such, the four corners are closed and formed by L shaped fittings 36, rather than left open. However, the diameter and shape of all the constituent parts are similar, providing the same circular seams, which can be welded in the same fashion. Since there are no open tube ends, however, a different type of nodal joint, indicated generally at 38, is used. Joint 38 is formed by the same bulge forming process described above, and has the same over-all T shape and plug diameters as does nodal joint 18. In addition, each joint 38 is bulge formed with a side branched fluid passage 40, smaller in diameter than the rest of joint 38. Passage 40 is provided solely as a point to inject and remove pressurized fluid (or to allow the exit of air as fluid is injected), and could be cut off, or simply left as is, once the frame was completed. Passage 40 simply provides the necessary fluid ingress and egress that the open tube ends provided in the embodiment described above. All other aspects of the method and forming apparatus would remain the same.

Variations in the method described could be made. As already noted, a larger, shell like space frame could be built up out of two or more sub frames, each formed according to the method described above, and then welded together by conventional means at a limited number of interconnection points. Those welds would be the more complex, non circular welds used in conventional space frame construction methods, but there would be far fewer of them. Alternatively, the dies themselves could be broken up into subsets, as opposed to two integral dies, and moved into place in steps around the initial frame. The set of dies would still close effectively as a single pair. As disclosed, the constituent tubes of the initial frame are all the same diameter, as are the nodal joint's plugs. Theoretically, various of the tubes (and respective joint plugs) could have different diameters, while still being cylindrical. This would make for a somewhat less standardized construction, in that robe stocks of different diameters would be needed from which to cut off the various constituent robes, but the seams themselves would still all be circular, and easy to form. Likewise, the constituent tubes could have differing wall thicknesses, regardless of their outer diameter. Theoretically, tubes of differing metals could be used, if the galvanic problems of dissimilar metals could be handled, possibly through nodal joints of an insulative character. Therefore, it will be understood that the invention is not intended to be limited to just the embodiment disclosed.

We claim:

1. A method for producing a frame structure, comprising the steps of, pre assembling an initial frame having a plurality of cylindrical metal tubes interconnected by the insertion of the ends of said cylindrical tubes onto mating plugs of pre formed hollow metal nodal joints at substantially uniform circular interfaces;

securely joining said tubes and nodal joints by welding at said circular interfaces;

placing the entire initial frame between a single set of hydroforming dies having mating cavities accommodating said tubes and joints and providing, when closed, a single cavity having a cross sectional shape matching the cross sectional shape desired for the completed frame structure and, pressurizing the entire interior of said initial frame to expand all of said tubes and joints out into said single cavity concurrently to complete said frame structure.

2. A method for producing a frame structure, comprising the steps of, pre assembling an initial frame having a plurality of same diameter cylindrical metal tubes interconnected by the insertion of the ends of said cylindrical tubes onto mating plugs of pre formed hollow metal nodal joints at uniform circular interfaces;

securely joining said tubes and nodal joints by welding at said circular interfaces;

placing the entire initial frame between a single pair of hydroforming dies having mating cavities accommodating said tubes and joints and providing, when closed, a single cavity having a cross sectional shape matching the cross sectional shape desired for the completed frame structure and, pressurizing the entire interior of said initial frame to expand all of said tubes and joints out into said single cavity concurrently to complete said frame structure.

3. A method for producing a frame structure, comprising the steps of, pre assembling an initial frame having a plurality of cylindrical metal tubes interconnected by the insertion of the ends of said cylindrical tubes inside of mating cylindrical sleeves of pre formed hollow metal nodal joints at substantially uniform circular interfaces;

securely joining said tubes and nodal joints by welding at said circular interfaces;

placing the entire initial frame between a single set of hydroforming dies having mating cavities accommodating said tubes and joints and providing, when closed, a single cavity having a cross sectional shape matching the cross sectional shape desired for the completed frame structure and, pressurizing the entire interior of said initial frame to expand all of said tubes and joints out into said single cavity concurrently to complete said frame structure.

* * * * *